E. KEMPSHALL.
TIRE.
APPLICATION FILED JULY 25, 1907.

917,734.

Patented Apr. 6, 1909.

Inventor
E. Kempshall

Witnesses

Attorney

UNITED STATES PATENT OFFICE.

ELEAZER KEMPSHALL, OF LONDON, ENGLAND, ASSIGNOR TO KEMPSHALL TYRE COMPANY, OF EUROPE, LIMITED, OF LONDON, ENGLAND.

TIRE.

No. 917,734.　　　Specification of Letters Patent.　　　Patented April 6, 1909.

Application filed July 25, 1907.　Serial No. 385,513.

*To all whom it may concern:*

Be it known that I, ELEAZER KEMPSHALL, a citizen of the United States of America, and residing at Hotel Russell, Russell Square, London, England, have invented certain new and useful Improvements in Tires, of which the following is a specification.

This invention relates to tires for vehicle wheels, and more particularly to tires of the self-sustaining type such as described, for instance, in British specifications Nos. 20481–3 of 1906, the object being to prevent such tires becoming heated while running.

The invention consists in perforating the tires so that when the wheels revolve during running, a current of air is induced through each tire and maintains it at a normal temperature.

Figure 1:
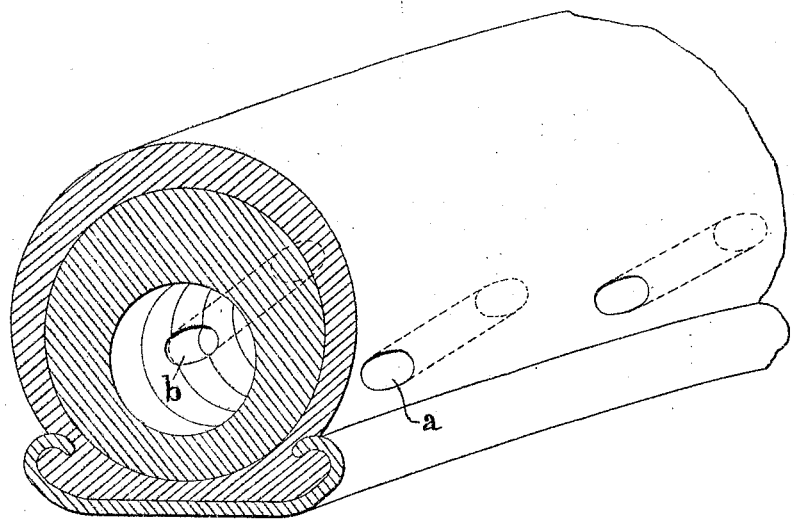
Figure 2:
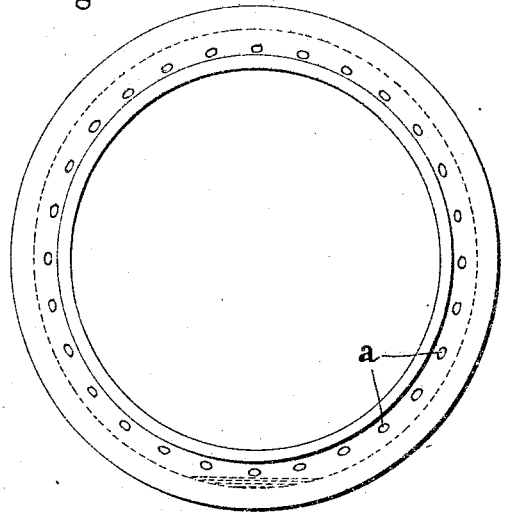
Figure 3:
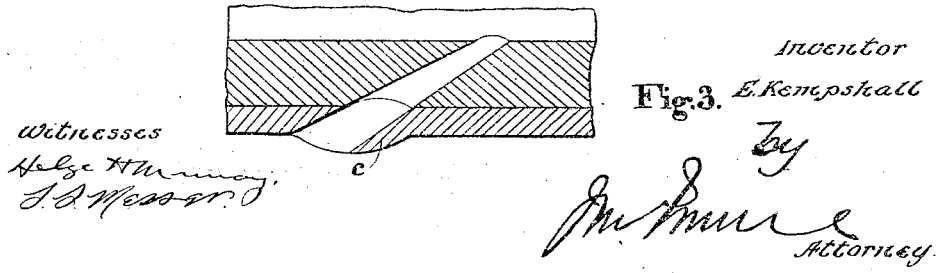

In the accompanying drawings, Figure 1 is a perspective view illustrating a portion of a self sustaining tire perforated according to the invention, Fig. 2 being a side view of the tire indicating the manner in which a small quantity of water may be retained, in the tire. Fig. 3 is a sectional view of a detail.

In carrying out the invention according to one mode, two sets of perforations, *a, b*, are arranged in the sides of the tire, the perforations, *a*, in one side of the tire being oppositely inclined to those, *b*, in the other side of the tire, so that when the vehicle is running, a current of air will be induced through one set of holes and out through the other set. The perforations may be formed during the molding of the tire, or they may be formed after the tire is completed, by means of a heated wire. It is preferred to arrange the perforations near the rim so that if water or other cooling fluid is inserted in the tire, a small quantity may be retained therein during the running of the vehicle as indicated in Fig. 2.

When inclined holes are used, those which are inclined in a forward direction may be formed with scoops as at *c*, Fig. 3 in order to catch the air or further induce an inward current of air.

Having now described my invention what I claim as new and desire to secure by Letters Patent is:—

1. A tire for vehicle wheels having a continuous internal space and perforations in the direction of the travel of the wheel and connecting said continuous internal space to the outside of the tire.

2. A tire for vehicle wheels having a continuous internal space and laterally inclined openings communicating with the continuous space and the outer sides of the tire.

3. A tire for vehicle wheels having an internal space and two sets of perforations leading from said internal space to the sides of the tire, one of said sets being inclined in the opposite direction to the other of said sets.

4. A tire for vehicle wheels having an internal space, lateral inclined perforations leading from said space to the sides of the tire and scoops arranged at the outer ends of such perforations for the purpose set forth.

5. A tire having a continuous internal space and two sets of perforations leading from said space to the outside of the tire, one set of perforations being laterally inclined to receive air as the tire revolves, and the other set of openings having their exits located to exhaust the air from the space when the other set of openings are taking in air.

6. In a tire of the self-sustaining type, an internal space and two sets of tapered perforations leading from said internal space to the sides of the tire, one of said sets being inclined in the opposite direction to the other of said sets for the purpose set forth.

7. A tire for vehicle wheels having an internal space and two sets of perforations leading from said internal space to the sides of the tire, one of said sets being inclined in the opposite direction to the other of said sets, one set of inclined openings being on one side of the tire and the other set being on the opposite side of said tire.

8. A tire for vehicle wheels having an internal space and lateral tapered openings leading from said space to the sides of the tire.

In testimony whereof I have signed my name to this specification in the presence of two subscribing witnesses.

ELEAZER KEMPSHALL.

Witnesses:
　ALBERT E. PARKER,
　HERBERT R. KERSLAKE.